United States Patent
Jayaraj et al.

(10) Patent No.: US 10,025,407 B2
(45) Date of Patent: Jul. 17, 2018

(54) SYSTEM AND METHOD FOR REMOTELY CONTROLLING A DEVICE

(71) Applicant: Wipro Limited, Bangalore (IN)

(72) Inventors: Ragupathy Jayaraj, Bangalore (IN); Mukesh Manjunath Prabhu, Bangalore (IN)

(73) Assignee: Wipro Limited, Bangalore (IN)

( * ) Notice: Subject to any disclaimer, the term of this patent is extended or adjusted under 35 U.S.C. 154(b) by 4 days.

(21) Appl. No.: 15/070,987

(22) Filed: Mar. 15, 2016

(65) Prior Publication Data
US 2017/0255286 A1    Sep. 7, 2017

(30) Foreign Application Priority Data

Mar. 3, 2016 (IN) .............................. 201641007469

(51) Int. Cl.
*G06F 3/041* (2006.01)
*G06F 3/01* (2006.01)

(52) U.S. Cl.
CPC .............. *G06F 3/041* (2013.01); *G06F 3/013* (2013.01)

(58) Field of Classification Search
CPC ......... G06F 3/013; G06F 3/041; G08C 23/00; G08C 2201/32; G08C 2201/93; G08C 2201/91; G08C 2201/70; G08C 2201/71; G08C 2201/90; H04N 5/00; H04N 5/4403
USPC ....................................................... 345/172
See application file for complete search history.

(56) References Cited

U.S. PATENT DOCUMENTS

| | | | |
|---|---|---|---|
| 8,736,773 B1 * | 5/2014 | Fan | H04N 5/4403 345/156 |
| 8,773,512 B1 | 7/2014 | Rafii | |
| 8,842,169 B2 | 9/2014 | Choi et al. | |
| 8,922,716 B2 | 12/2014 | An et al. | |
| 8,988,342 B2 | 3/2015 | Choi et al. | |
| 2008/0309634 A1 * | 12/2008 | Hotelling | G06F 1/1626 345/173 |
| 2009/0168124 A1 * | 7/2009 | Edwards | H04N 1/00411 358/488 |
| 2017/0123491 A1 * | 5/2017 | Hansen | G06F 3/013 |

FOREIGN PATENT DOCUMENTS

JP    2012156834    8/2012

OTHER PUBLICATIONS

IP.com Disclosure No. IPCOM000200838D, Anonymous, Oct. 27, 2010, retrieved from http://priorart.ip.com/IPCOM/000200838 on May 12, 2017.*

* cited by examiner

*Primary Examiner* — Mark Edwards
(74) *Attorney, Agent, or Firm* — LeClairRyan PLLC

(57) ABSTRACT

This disclosure relates generally to remotely controlling devices, and more particularly to system and method for remotely controlling devices using a transparent touch screen based remote control device. In one embodiment, a method is provided for remotely controlling a target device. The method comprises capturing a touch based action performed by a user on a transparent touch screen of the remote control device, determining the target device from a plurality of remotely controllable devices, determining an intent of the user with respect to the target device based on the touch based action, and controlling the target device based on the intent by transmitting a control signal to the target device.

20 Claims, 4 Drawing Sheets

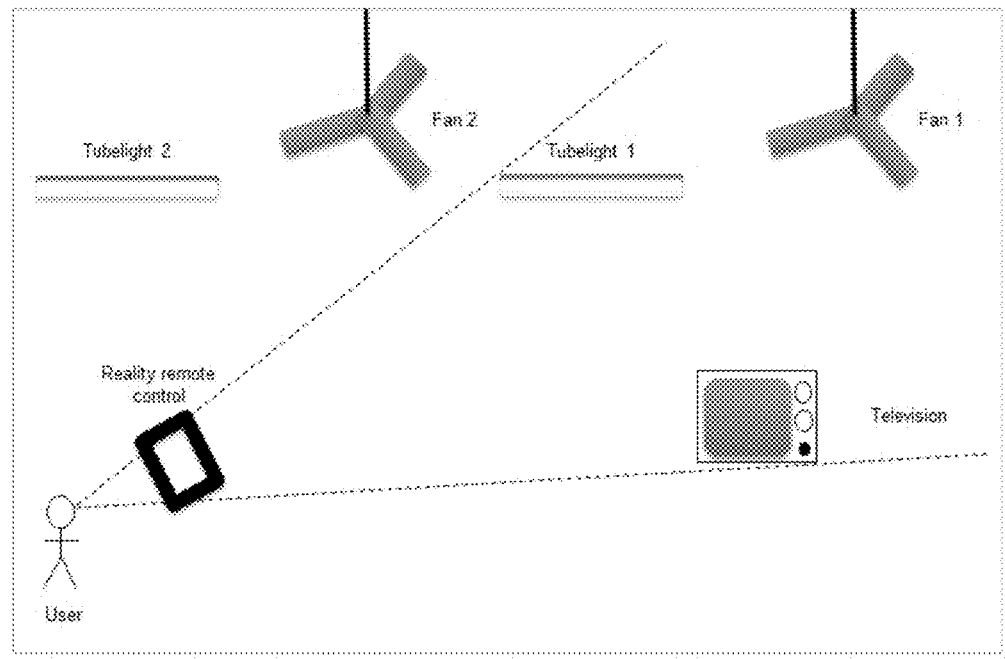
FIG. 3A
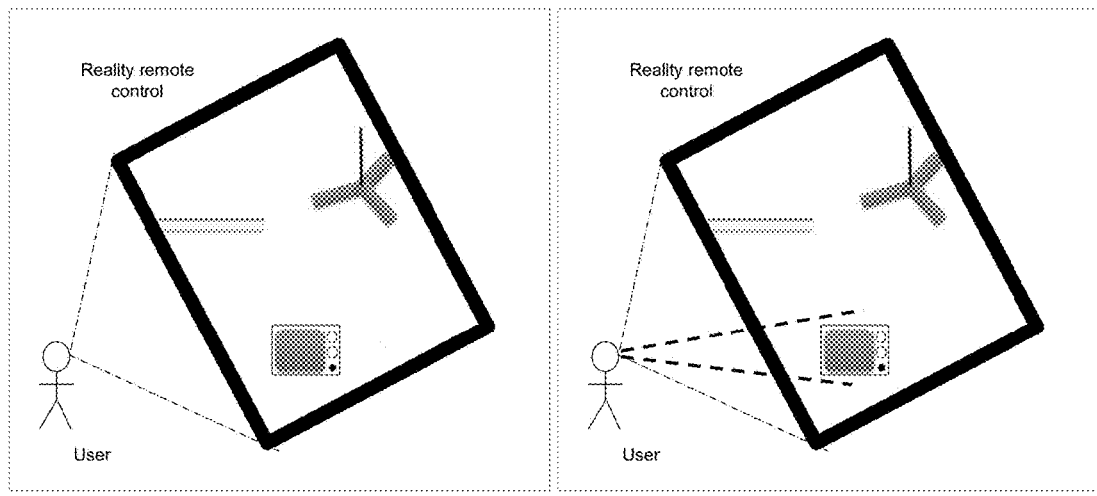
FIG. 3B  FIG. 3C

SYSTEM AND METHOD FOR REMOTELY CONTROLLING A DEVICE

This application claims the benefit of U.S. Provisional Patent Application Ser. No. 201641007469, filed Mar. 3, 2016, which is hereby incorporated by reference in its entirety.

FIELD

This disclosure relates generally to remotely controlling devices, and more particularly to system and method for remotely controlling devices using a transparent touch screen based remote control device.

BACKGROUND

Remote control devices are widely employed to control a wide variety of remotely controllable devices and appliances such as televisions, video players, home theater systems, lighting devices, doors, washing machines, air conditioners, and so forth. With the advancement of technology, various types of remote control devices are available based on a input method (e.g., remote control device using physical keys, voice commands, gesture detection, sensor movements, touch screen, etc.), or based on a communication technology employed (e.g., infrared, Bluetooth, telecommunication signal, other wireless technology, etc.).

Though existing remote control devices provide various ways for interacting with the devices, the interaction techniques are usually not convenient and non-intuitive. For example, it is not uncommon to see each household having different remote control devices for different devices and appliances. Each of the remote control devices has its own pre-defined set of hard buttons to be remembered. Further, even universal remote control devices come with pre-defined set of hard buttons. A user needs to identify and press buttons of the remote control devices accordingly for his intended manipulation of the target device.

Remote control devices having interactive touch screen displays addresses above limitations but they are usually costly and consume more power than regular remote control devices. Remotely controlling devices and appliances with gesture is another alternative, but they usually require the remotely controllable devices and appliances to be equipped with gesture detection and recognition techniques. This may mean duplication of remote control system for different devices. Further, even in cases where there is a universal gesture based remote control, it requires the user to remember many gestures to interact with the remotely controllable devices. For example, there may be different gestures to select the volume control and channel control of a television, whereas in a physical world the user would just press a different button in both cases.

In summary, existing remote control devices have the following limitations: non-intuitive way to select a target device to control, non-intuitive way to control the target device, increase in power consumption and cost of the remote control device employing touch sensitive displays.

SUMMARY

In one embodiment, a method for remotely controlling a target device is disclosed. In one example, the method comprises capturing a touch based action performed by a user on a transparent touch screen of the remote control device. The method further comprises determining the target device from a plurality of remotely controllable devices. The method further comprises determining an intent of the user with respect to the target device based on the touch based action. The method further comprises controlling the target device based on the intent by transmitting a control signal to the target device.

In one embodiment, a system for remotely controlling a target device is disclosed. In one example, the system comprises at least one processor and a memory communicatively coupled to the at least one processor. The memory stores processor-executable instructions, which, on execution, cause the processor to capture a touch based action performed by a user on a transparent touch screen of the remote control device. The processor-executable instructions, on execution, further cause the processor to determine the target device from a plurality of remotely controllable devices. The processor-executable instructions, on execution, further cause the processor to determine an intent of the user with respect to the target device based on the touch based action. The processor-executable instructions, on execution, further cause the processor to control the target device based on the intent by transmitting a control signal to the target device.

In one embodiment, a non-transitory computer-readable medium storing computer-executable instructions for remotely controlling a target device is disclosed. In one example, the stored instructions, when executed by a processor, cause the processor to perform operations comprising capturing a touch based action performed by a user on a transparent touch screen of the remote control device. The operations further comprise determining the target device from a plurality of remotely controllable devices. The operations further comprise determining an intent of the user with respect to the target device based on the touch based action. The operations further comprise controlling the target device based on the intent by transmitting a control signal to the target device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3A-3D depicts an exemplary user interaction with a remote control device for remotely controlling a target device in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
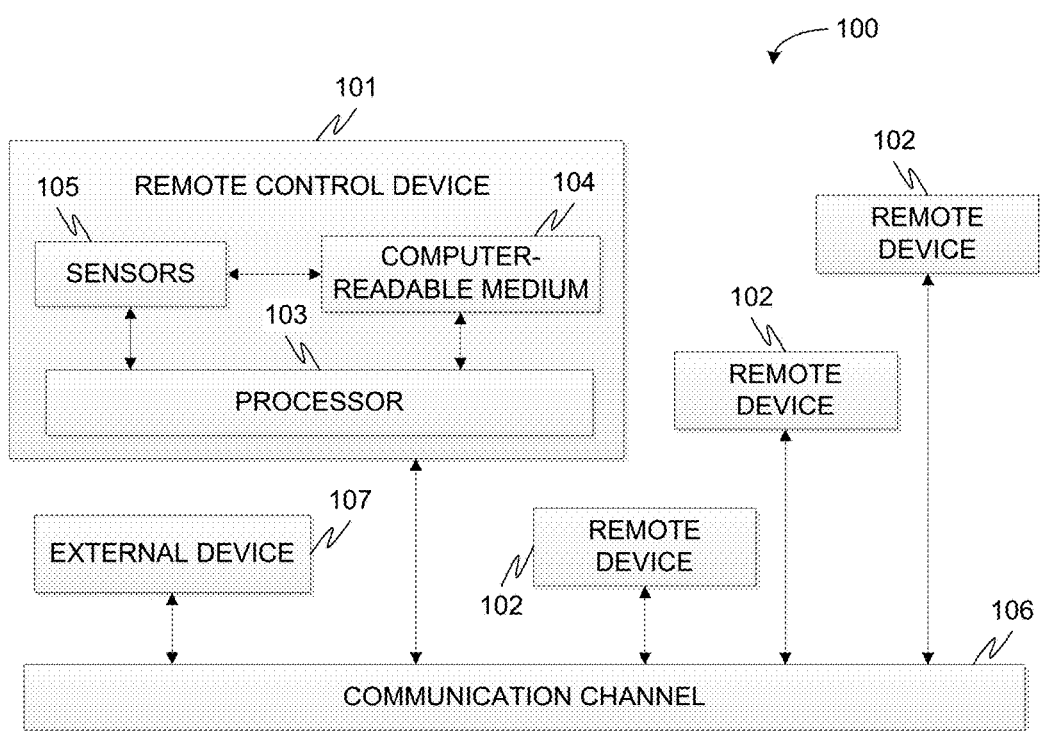
FIG. 1 is a block diagram of an exemplary system for remotely controlling various devices in accordance with some embodiments of the present disclosure.

Referring now to FIG. 1, an exemplary system 100 for remotely controlling various devices is illustrated in accordance with some embodiments of the present disclosure. In particular, the system 100 includes a remote control device 101 that enables a user to see, virtually touch, and remotely control various remotely controllable devices 102. As will be appreciated by those skilled in the art, the remotely controllable devices 102 are electric or electronic devices such as televisions, video players, home theater systems, lighting devices, doors, washing machines, air conditioner, room heater, and so forth. The remote control device 101 implements a remote control engine for remotely controlling a target device from among various remotely controllable devices 102. The remote control engine captures a touch based action performed by the user on a transparent touch screen of the remote control device, determines a target device from a plurality of remotely controllable devices, determines an intent of the user with respect to the target device based on the touch based action, and controls the target device based on the intent by transmitting a control signal to the target device.

The remote control device 101 comprises one or more processors 103, a computer-readable medium (e.g., a memory) 104, and one or more sensors 105. The user interacts with the remote control device 101 via the one or more sensors 105. The one or more sensors 105 may include, but are not limited to, a GPS sensor, a proximity sensor, a transparent touch screen, a hard button, a key, a touch pad, a tracker ball, an imaging device, a microphone, a gyroscope, a magnetometer, a RFID sensor, a smart tag sensor, a beacon, and an accelerometer. The one or more sensors 105 capture various sensor parameters such as location, position, and orientation of the remote control device 101, RF identification or smart tag identification of various remotely controllable devices 102, presence of other beacons on various remotely controllable devices 102, image of the environment or the user, presence of the user, gaze of the user, voice of the user, touch based and non-touch based actions performed by the user, and so forth. The sensor parameters enable the remote control device 101 to determine the target device and to determine the intent of the user with respect to the target device. The computer-readable medium 104 stores instructions that, when executed by the one or more processors 103, cause the one or more processors 103 to remotely control various devices in accordance with aspects of the present disclosure. The computer-readable storage medium 104 may also store multiple sensor parameters captured by the sensors 105 and other data as required or as processed by the system 100. The one or more processors 103 perform data processing functions so as to determine the target device, determine the intent of the user with respect to the target device, determine control information corresponding to the intent of the user, and generate a control signal corresponding to the control information.

The remote control device 101 also interacts with the remotely controllable devices 102 over a communication channel 106 for sending the control signal to the target device which the user intends to control. In some embodiments, the remote control device 101 may also receive present settings of the target device from the target device over the communication channel 106. The communication channel 106 may be any wired or wireless communication channel based on different communication technologies (e.g., WiFi, WiMax, Bluetooth, Infrared, Radio Frequency, mobile communication technologies, and so forth). In some embodiments, the remote control device 101 and the remotely controllable device 102 may also interact with one or more external devices 107 over the communication channel 106. The external devices 107 may include, but are not limited to, a remote control server, a central control box, a set-top box, a computer, a mobile device, and another digital device. The external devices 107 may be located locally or remotely with respect to the remote control device 101 and the remotely controllable device 102.

Figure 2:
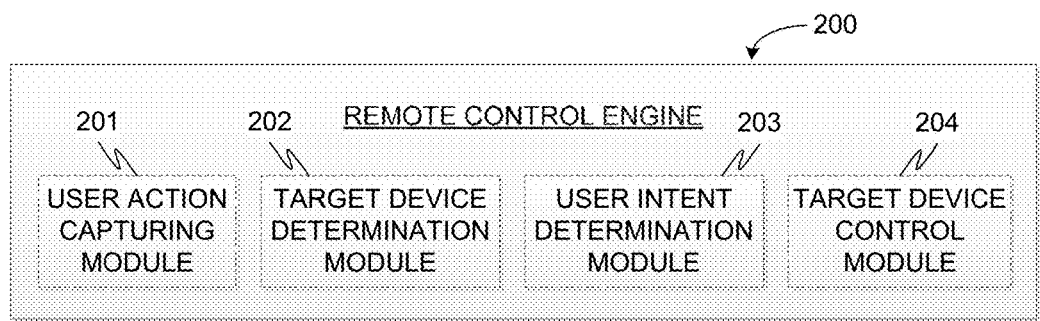
FIG. 2 is a functional block diagram of a remote control engine in accordance with some embodiments of the present disclosure.

Referring now to FIG. 2, a functional block diagram of the remote control engine 200 implemented by the system 100 of FIG. 1 is illustrated in accordance with some embodiments of the present disclosure. In some embodiments, the remote control engine 200 comprises a user action capturing module 201, a target device determination module 202, a user intent determination module 203, and a target device control module 204. As will be appreciated by those skilled in the art, each of the modules 201-204 may reside, in whole or in parts, on the remote control device 101 and/or the external device 107. Additionally, in some embodiments, one or more of the modules 201-204 may reside, in whole or in parts, on the remotely controllable devices 102.

The user action capturing module 201 captures the actions performed by the user via the one or more sensors of the remote control device. For example, the user action capturing module 201 may capture touch based actions performed by the user on the transparent touch screen or the touch pad of the remote control device. It should be noted that the touch based actions may include touch based inputs (e.g., tapping, double tapping, pressing, etc.) and touch based gestures (e.g., panning, swiping, flicking, pinching, etc.) of the user. Further, it should be noted that such touch based actions may be performed on either side of the transparent touch screen. Additionally, the user action capturing module 201 may capture non-touch based actions performed by the user on the hard buttons, keys, tracker balls, joystick, motion sensor, accelerometer, and so forth. It should be noted that the non-touch based actions may include inputs (e.g., clicking, double clicking, pressing) and non-touch based gestures (e.g., scrolling, moving, motion, etc.) of the user. In some embodiments, the user action capturing module 201 may also detect an intent of the user to use the remote control device by detecting the presence of the user using the proximity sensor.

The target device determination module 202 determines the target device from various remotely controllable devices in the vicinity of the remote control device or in the field of view of the remote control device. The target device determination module 202 first detects various remotely controllable devices via the one or more sensors of the remote control device. For example, the target device determination module 202 detects various remotely controllable devices in the vicinity of the remote control device via the RFID tag, the smart tag, or the beacon attached to each of the remotely controllable devices. Alternatively, the target device determination module 202 detects various remotely controllable devices in the field of view of the remote control device via the imaging device of the remote control device. Thus, a camera facing an environment captures an image of a field of view of the remote control device such that the field of view comprises one or more of various remotely controllable devices present in the environment.

The target device determination module 202 then determines the target device from the detected remotely controllable devices. In some embodiments, the target device determination module 202 determines the target device based on an indication by the user. In some embodiments, the indication may be determined from a touch based action performed by the user. For example, the user may tap on one of the remotely controllable devices as viewed from the transparent touch screen to select the target device. Alternatively, the user may draw a representation on the transparent touch screen to select the target device. For example, the user may draw a first letter or first few letters of the intended target device (e.g., T for TV, F for Fan, L for light, etc.) or a symbol of the intended target device (e.g., a box for TV, a star for Fan, etc.). Alternatively, the user may perform a touch based gesture to zoom-in on one of the remotely controllable devices so as to select the target device. Additionally, in some embodiments, the indication may be determined from a non-touch based action performed by the user. For example, the user may move the remote control device to zoom-in on one of the remotely controllable devices as viewed from the transparent touch screen to select the target device. Alternatively, the user may press a hard button upon moving the remote control device in close proximity to one of the remotely controllable devices so as to select the target device. In some embodiments, the indication may be captured by the remote control device and mapped onto the image of the field of view to determine the target device.

Further, in some embodiments, the target device determination module 202 determines the target device by capturing a gaze of the user, determining a field of view of the user with respect to the remote control device based on the gaze, mapping the field of view of the user onto the field of view of the remote control device, and determining the target device based on the mapping. As will be appreciated by those skilled in the art, the gaze of the user may be tracked using various techniques that involve attachments to the eye (e.g., special lens), images of the eye taken via an imaging device (e.g., a camera facing the user), and so forth. Further, the field of view of the user with respect to the remote control device is determined by determining a position, an orientation, and a focus of user eyes with respect to the reality remote control. Additionally, in some embodiments, the target device determination module 202 determines a position and an orientation of the remote control device, and that of the plurality of remotely controllable devices with respect to the remote control device so as to perform mapping. It should be noted that, the position and the orientation of the remote control device may be determined via one or more sensors (e.g., the gyroscope, the GPS sensor, the magnetometer, etc.) and/or image processing while the position and the orientation of the user and the remotely controllable devices may be determined via image processing.

The user intent determination module 203 determines the intent of the user with respect to the target device based on various actions performed by the user via the one or more sensors of the remote control device. In some embodiments, the user intent determination module 203 determines the intent of the user based on the touch based actions performed by the user on the transparent touch screen of the remote control device. Additionally, in some embodiments, the user intent determination module 203 determines a parameter of the target device that user intends to control, and a measure of the parameter. For example, the parameter may be a state of the target device (e.g., ON or OFF), a speed of the fan or air-conditioner, a volume of a television, a channel playing on the television, an intensity of the light, a color of the light, and so forth. Similarly, the measure may be an increase or a decrease of speed by two notches, an increase or a decrease of volume by 5 notches, an increase or a decrease of channel numbers, switching directly to a particular channel, switching to a pre-set color scheme of the lighting device, playing a particular track on a home theatre, and so forth. In some embodiments, the user intent determination module 203 determines the intent based on the touch based actions performed by the user on a view of the target device seen through the transparent touch screen of the remote control device. For example, the user may double tap on the target device to switch on or switch of the target device, swipe to change the mode or channel of the target device, pan-out or pan-in to increase or decrease volume or speed of the target device, and so forth. Alternatively, the user may touch and act on the view of a knob or a hard button of the target device as if the user were actually using that knob or hard button to control the associated parameter.

The target device control module 204 controls the target device based on the determined intent by transmitting a control signal to the target device. The target device control module 204 determines a control information based on the intent and generates the control signal corresponding to the control information. In some embodiments, the target device control module 204 determines a control information based on the intent and a present setting of the target device, and generates the control signal corresponding to the control information. The target device control module 204 communicates to and from the target device so as to receive the present setting of the target device and/or to transmit the control signal.

Referring now to FIG. 3, an exemplary user interaction with the remote control device for remotely controlling a target device is illustrated in accordance with some embodiments of the present disclosure. By way of an example, FIG. 3A depicts a living room with multiple remotely controllable devices (i.e., 2 fans, 2 tube lights, and a television), and a user in possession of the remote control device. The user looks through the transparent touch screen of the remote control device and sees some of the multiple remotely controllable devices in the field of view of the remote control device. By way of an example, FIG. 3B depicts the field of view of the remote control device as seen by the user through the transparent touch screen and including tube light 1, fan 1 and the television. The remote control device captures the field of view of the remote control device via an image acquisition system facing the environment. As discussed above, the image acquisition system may include one or more cameras attached to the upper front region of the remote control device as well as any additional device. In some embodiments, the image acquisition system may include a pair of generic two dimensional cameras, spaced apart a distance, that acquire two dimensional images from two vantage points. In some embodiments, the one or more cameras may be installed even outside the remote control device such as on the remotely controllable devices or at vantage points in the environment. The one or more cameras acquire one or more images of field of view of the remote control device and store the acquired images in the memory. The field of view may include at least one of the various remotely controllable devices in the environment. The images form one of the key inputs for subsequent determination of field of view of the user with respect to that of the remote control device, the intent of the user, and so forth.

The remote control device then captures the viewing angle of the user via another image acquisition system facing the user or via any other sensors. Again, the image acquisition system may include one or more cameras as well as any additional device. A position, an orientation, and a focus of eye of the user with respect to the remote control device may then be calculated based on any eye tracking methodologies. By way of an example, FIG. 3C depicts a field of view of the user with respect to the field of view of the remote control device. Thus, for example, though the field of view of the remote control device includes 3 devices (i.e., fan 1, tube light 1, and television), the user may be looking at one of the 3 devices (i.e., television) at a given point of time. Hence, the position, the orientation, and the focus of eye calculated may be used in determining the target device that the user intends to remotely control.

The remote control device then maps the field of view of the user with the field of view of the remote control device as seen through the transparent screen based on the above captured inputs so as to determine the target device. A position and an orientation of remote control device may be calculated based on various sensors parameters received from various sensors (e.g., the GPS, the gyroscope, the magnetometer, the accelerometer, etc.) in the remote control device. Further, as discussed above, the field of view of the user and the position and orientation of the remotely controllable devices with respect to the remote control device is typically calculated based on images received the camera(s) by image processing techniques. In some embodiments, the position and the orientation of the remotely controllable devices may be calculated based on other methodologies as well. For example, the remotely controllable device may include various sensors that acquire various sensors parameters for calculation of its position and orientation that may then be sent to the remote control device.

The remote control device then captures a touch based action performed by the user on the transparent touch screen of the remote control device. The touch based action may then be processed to determine the intent of the user with respect to the target device and activates the remote control device to remotely control the target device. As discussed above, the touch based action may include touch based input and touch based gesture. For example, touch and rotate gesture on the volume amplifier control of the television seen through the touch enabled transparent glass would indicate an intention to control the volume of the television. In some embodiments, if the intention with respect to the target device is not recognized through the touch based inputs then the remote control device may be configured to recognize a touch based gesture through the transparent touch screen. Similarly, in some embodiments, if the intention with respect to the target device is not recognized through the touch based inputs or touch based gesture then the remote control device may be configured to recognize touch based gesture input on a different side of the transparent touch screen.

Figure 3D:
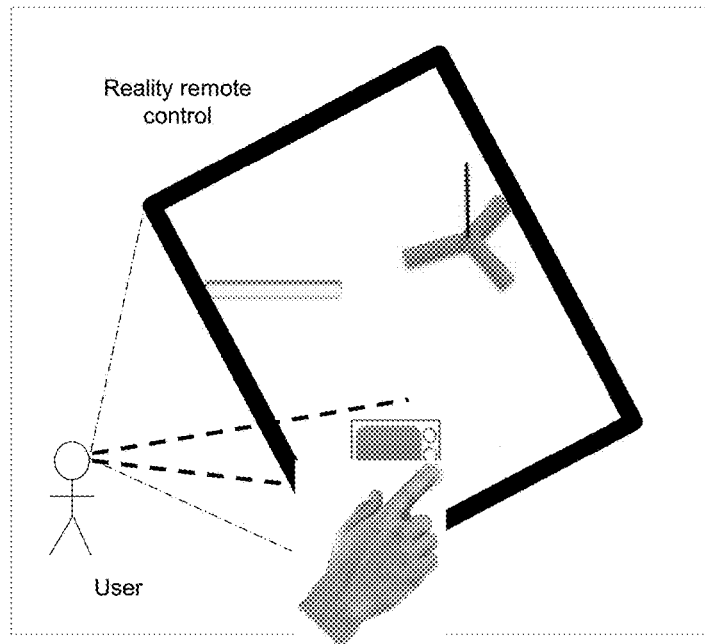

The remote control device then determines the intent of the user using the captured action performed by the user, and the mapping of the user's field of view onto the field of view of the remote control device. In particular, the remote control device determines a particular target device to be controlled from among the multiple target devices, a parameter of the device user is intending to control, an action that the user wish to perform with respect to the parameter, and optionally a measure of the action. By way of an example, FIG. 3D depicts an action performed by the user with respect to the target device. Thus, for example, the remote control device calculates that the user intention is to control the television based on user's field of view and touch based action performed by the user on the transparent glass. In particular, the remote control device calculates that the user intention is to switch off or switch on the television based on user's focus on power button of the television followed by a subsequent touch based input on the power button as viewed on the transparent touch screen. Similarly, the remote control device may calculate that the user intention is to control the volume of the television if the user looks at the television, focus on the volume button, and rotate the button clock-wise or anti-clock-wise.

The remote control device then transmits a control signal corresponding to the intention of the user to the target device so as to control the target device in accordance with the intention of the user. In some embodiments, the remote control device may receive the present status or settings of the target device based on image attributes or by communicating with the target device. Further, the remote control device determines control command based on the intention of the user and optionally also based on the status or present setting of the target device. The remote control device then remotely controls the target device or controls one or more functionalities or operations of the target device by generating and transmitting a control signal corresponding to the control command. As discussed above, the communication between the remote control device and the target device may be enabled using different communications technologies such as infrared, Bluetooth, wireless, and so forth.

As will be appreciated by one skilled in the art, a variety of processes may be employed for remotely controlling a target device. For example, the exemplary system 100 may remotely control a target device by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 4:
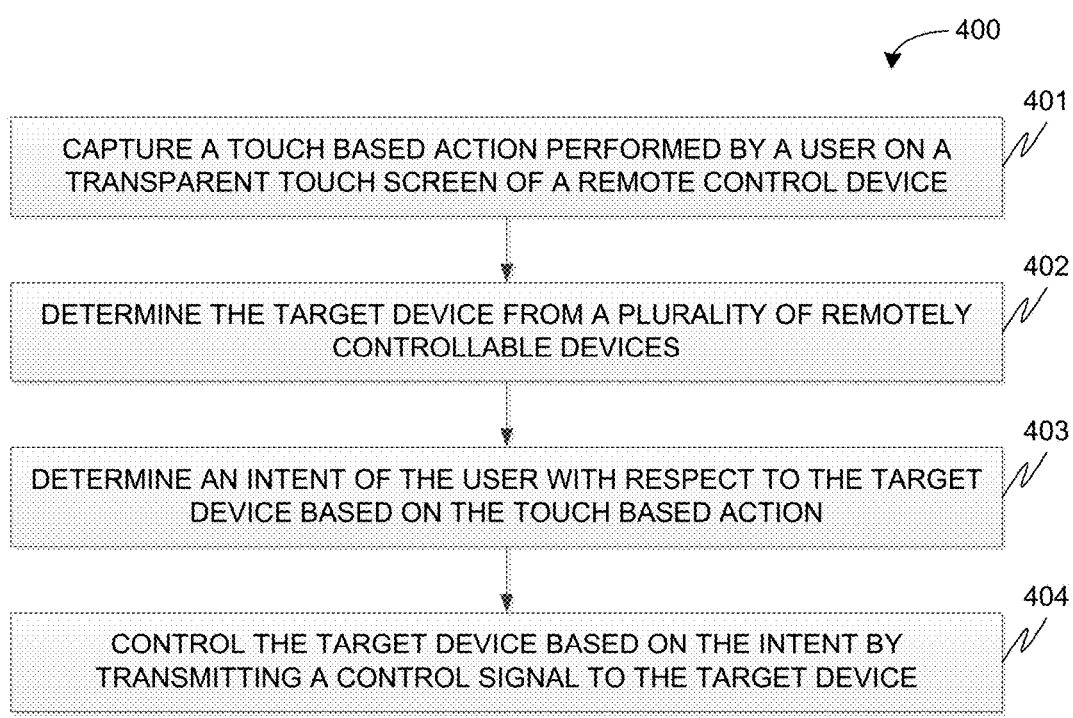
FIG. 4 is a flow diagram of an exemplary process for remotely controlling a target device in accordance with some embodiments of the present disclosure.

For example, referring now to FIG. 4, exemplary control logic 400 for remotely controlling a target device via a system, such as system 100, is depicted via a flowchart in accordance with some embodiments of the present disclosure. As illustrated in the flowchart, the control logic 400 includes the steps of capturing a touch based action performed by a user on a transparent touch screen of a remote control device at step 401, determining the target device from a plurality of remotely controllable devices at step 402, determining an intent of the user with respect to the target device based on the touch based action at step 403, and controlling the target device based on the intent by transmitting a control signal to the target device at step 404.

In some embodiments, capturing the touch based action at step 401 comprises capturing at least one of a touch based input and a touch based gesture of the user on at least one of a side of the transparent touch screen. In some embodiments, the control logic 400 may further include the step of detecting the plurality of remotely controllable devices via a sensor. In some embodiments, the control logic 400 may further include the step of capturing an image of a field of view of the remote control device via an imaging device facing an environment. It should be noted that the environment comprises the plurality of remotely controllable devices and the field of view comprises at least one of the plurality of remotely controllable devices. Additionally, in some embodiments, determining the target device at step 402 comprises capturing a gaze of the user, determining a field of view of the user with respect to the remote control device based on the gaze, mapping the field of view of the user onto the field of view of the remote control device, and determining the target device based on the mapping. Further, in some embodiments, mapping the field of view of the user onto the field of view of the remote control device comprises determining a position and an orientation of the remote control device, or determining a position and an orientation of the plurality of remotely controllable devices with respect to the remote control device. Moreover, in some embodiments, determining the target device comprises determining the target device based on an indication by the user. In some embodiments, the indication is determined from the touch based action.

Again, in some embodiments, determining the intent at step 403 comprises determining at least one of a parameter of the target device that user intends to control, and a measure of the parameter. Further, in some embodiments, determining the intent at step 403 comprises determining the intent based on the touch based action performed on a view of the target device seen through the transparent touch screen of the remote control device. Further, in some embodiments, controlling the target device at step 404 comprises remotely obtaining a present setting of the target device from the target device, determining a control information based on the intent and the present setting of the target device, and generating the control signal corresponding to the control information.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
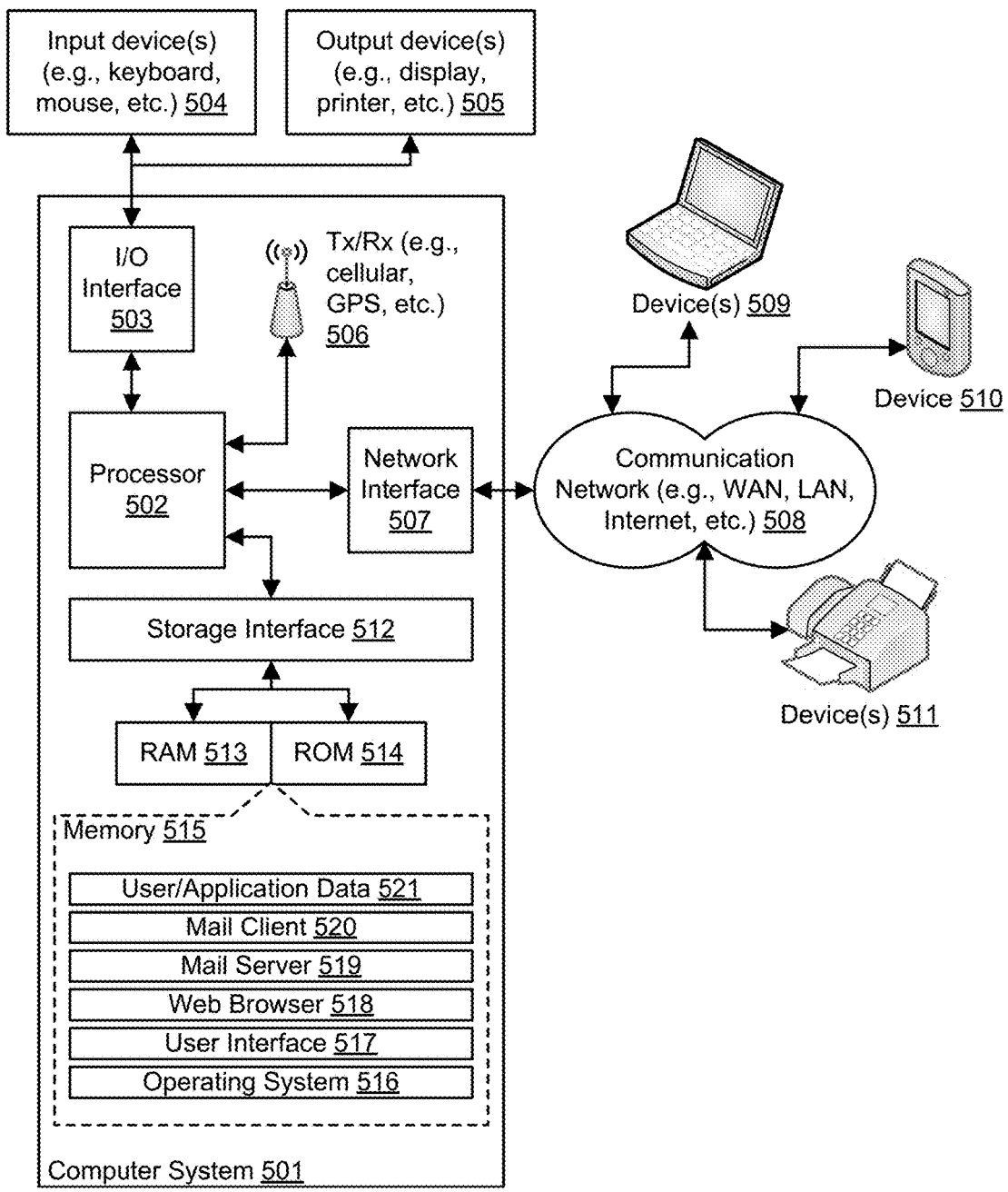
FIG. 5 is a block diagram of an exemplary computer system for implementing embodiments consistent with the present disclosure.

Referring now to FIG. 5, a block diagram of an exemplary computer system 501 for implementing embodiments consistent with the present disclosure is illustrated. Variations of computer system 501 may be used for implementing system 100 for remotely controlling a target device. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., identification of various remotely controllable devices, sensor parameters, actions performed by the user, control commands, present status or settings of the target device, positions and orientations of the remote control device, the user, and the remotely controllable devices, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above enables the user to look through and virtually touch the target device through the remote control device so as to select and control a particular target device from a list of remotely controllable devices. The remote control device enables user interaction with a device or an appliance by detecting user gestures and converting the gestures to commands that are wirelessly transmitted to the appliance. Thus, selection and control of the remotely controllable target device through the remote control device described in various embodiments discussed above is more intuitive, user friendly, and accurate in comparison to existing remote control devices. The use of transparent touch screen without display reduces the cost and power requirement of the remote control device described in various embodiments discussed above in comparison to existing remote control devices having touch screen displays.

The specification has described system and method for remotely controlling a target device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium"

should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for remotely controlling a target device, the method comprising:
    capturing, via a processor, a touch based action performed by a user on a touch enabled transparent glass of a remote control device, wherein the touch based action is performed on a portion of a view of the target device seen through the touch enabled transparent glass without requiring a user to perform an alignment between the view of the target device and the target device, and wherein the touch enabled transparent glass comprises touch sensors and does not have a capability to display;
    determining, via the processor, an intent of the user with respect to the target device based on the touch based action by determining an operational parameter of the target device that corresponds to the portion of the view of the target device and that the user intends to control, wherein the operational parameter is a state of the target device or an intrinsic setting of the target device; and
    controlling, via the processor, the target device based on the intent by transmitting a control signal to the target device.

2. The method of claim 1, wherein capturing the touch based action comprises capturing at least one of a touch based input and a touch based gesture of the user on at least one of a side of the touch enabled transparent glass.

3. The method of claim 1, further comprising:
    detecting at least one of a plurality of remotely controllable devices; and
    determining the target device from at least one of the plurality of remotely controllable devices.

4. The method of claim 3, wherein detecting at least one of the plurality of remotely controllable devices comprises capturing an image of a field of view of the remote control device via an imaging device facing an environment, wherein the environment comprises the plurality of remotely controllable devices and the field of view comprises at least one of the plurality of remotely controllable devices.

5. The method of claim 4, wherein determining the target device comprises:
    capturing a gaze of the user;
    determining a field of view of the user with respect to the remote control device based on the gaze;
    mapping the field of view of the user onto the field of view of the remote control device; and
    determining the target device based on the mapping.

6. The method of claim 5, wherein mapping comprises at least one of:
    determining a position and an orientation of the remote control device; and
    determining a position and an orientation of the plurality of remotely controllable devices with respect to the remote control device.

7. The method of claim 3, wherein detecting at least one of the plurality of remotely controllable devices comprises detecting at least one of the plurality of remotely controllable devices using sensors embedded in each of the plurality of remotely controllable devices, and wherein determining the target device comprises determining the target device based on an indication by the user.

8. The method of claim 1, wherein determining the intent further comprises determining a measure of a control intended by the user with respect to the operational parameter.

9. The method of claim 1, wherein controlling the target device comprises:
    remotely obtaining a present setting of the target device from the target device;
    determining a control information based on the intent and the present setting of the target device; and
    generating the control signal corresponding to the control information.

10. A system for remotely controlling a target device, the system comprising:
    at least one processor; and
    a computer-readable medium storing instructions that, when executed by the at least one processor, cause the at least one processor to perform operations comprising:
        capturing a touch based action performed by a user on a touch enabled transparent glass of a remote control device, wherein the touch based action is performed on a portion of a view of the target device seen through the touch enabled transparent glass without requiring a user to perform an alignment between the view of the target device and the target device, and wherein the touch enabled transparent glass comprises touch sensors and does not have a capability to display;
        determining an intent of the user with respect to the target device based on the touch based action by determining an operational parameter of the target device that corresponds to the portion of the view of the target device and that the user intends to control, wherein the operational parameter is a state of the target device or an intrinsic setting of the target device; and
        controlling the target device based on the intent by transmitting a control signal to the target device.

11. The system of claim 10, wherein the operations further comprise:
    detecting at least one of a plurality of remotely controllable devices; and
    determining the target device from at least one of the plurality of remotely controllable devices.

12. The system of claim 11, wherein detecting at least one of the plurality of remotely controllable devices comprises capturing an image of a field of view of the remote control device via an imaging device facing an environment, and wherein the environment comprises the plurality of remotely controllable devices and the field of view comprises at least one of the plurality of remotely controllable devices.

13. The system of claim 12, wherein determining the target device comprises:
    capturing a gaze of the user;
    determining a field of view of the user with respect to the remote control device based on the gaze;
    mapping the field of view of the user onto the field of view of the remote control device; and
    determining the target device based on the mapping.

14. The system of claim 13, wherein mapping comprises at least one of:
    determining a position and an orientation of the remote control device; and determining a position and an orientation of the plurality of remotely controllable devices with respect to the remote control device.

15. The system of claim 11, wherein detecting at least one of the plurality of remotely controllable devices comprises detecting at least one of the plurality of remotely controllable devices using sensors embedded in each of the plurality of remotely controllable devices, and wherein determining the target device comprises determining the target device based on an indication by the user.

16. The system of claim 10, wherein determining the intent further comprises determining a measure of a control intended by the user with respect to the operational parameter.

17. The system of claim 10, wherein controlling the target device comprises:
   remotely obtaining a present setting of the target device from the target device;
   determining a control information based on the intent and the present setting of the target device; and
   generating the control signal corresponding to the control information.

18. A non-transitory computer-readable medium storing computer-executable instructions for:
   capturing a touch based action performed by a user on a touch enabled transparent glass of a remote control device, wherein the touch based action is performed on a portion of a view of the target device seen through the touch enabled transparent glass without requiring a user to perform an alignment between the view of the target device and the target device, and wherein the touch enabled transparent glass comprises touch sensors and does not have a capability to display;
   determining an intent of the user with respect to the target device based on the touch based action by determining an operational parameter of the target device that corresponds to the portion of the view of the target device and that the user intends to control, wherein the operational parameter is a state of the target device or an intrinsic setting of the target device; and
   controlling the target device based on the intent by transmitting a control signal to the target device.

19. The method of claim 7, wherein the indication is determined from the touch based action, and wherein the touch based action comprises drawing a pre-configured representation corresponding to the target device.

20. The system of claim 15, wherein the indication is determined from the touch based action, and wherein the touch based action comprises drawing a pre-configured representation corresponding to the target device.

* * * * *